(12) United States Patent
Sato

(10) Patent No.: US 9,785,156 B2
(45) Date of Patent: Oct. 10, 2017

(54) MOTOR CONTROL SYSTEM, METHOD, AND DEVICE FOR CHANGING CONTROL SOFTWARE FOR A VEHICLE COOLING BLOWER

(71) Applicant: Daisuke Sato, Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 368 days.

(21) Appl. No.: 14/238,514

(22) PCT Filed: Apr. 24, 2013

(86) PCT No.: PCT/JP2013/002768
§ 371 (c)(1),
(2) Date: Feb. 12, 2014

(87) PCT Pub. No.: WO2013/186975
PCT Pub. Date: Dec. 19, 2013

(65) Prior Publication Data
US 2014/0200732 A1 Jul. 17, 2014

(30) Foreign Application Priority Data

Jun. 12, 2012 (JP) .................................. 2012-132459

(51) Int. Cl.
G05D 23/19 (2006.01)
B60R 16/02 (2006.01)
H02P 7/00 (2016.01)

(52) U.S. Cl.
CPC ......... *G05D 23/1917* (2013.01); *B60R 16/02* (2013.01); *H02P 7/00* (2013.01)

(58) Field of Classification Search
None
See application file for complete search history.

(56) References Cited

U.S. PATENT DOCUMENTS 9,166,517 B2 * 10/2015 Sato ........................ H02P 6/001

2004/0189092 A1 * 9/2004 Burlak .................. B60R 16/023
307/10.1
(Continued)

FOREIGN PATENT DOCUMENTS

| CN | 201134785 Y | 10/2008 |
|---|---|---|
| JP | 2001-260638 A | 9/2001 |

(Continued)

OTHER PUBLICATIONS

'Class B Data Communications Network Interface-SAE J1850', pp. 23.623-23.643, Society of Automotive Engineers, 2001.*
Communication pursuant to Article 94(3) EPC dated Jul. 3, 2015 for the related European Patent Application No. 13804104.1.
Supplementary European Search Report for Appl. No. EP 13 80 4104 dated Sep. 12, 2014.

(Continued)

*Primary Examiner* — Mohammad Ali
*Assistant Examiner* — Bernard G Lindsay
(74) *Attorney, Agent, or Firm* — RatnerPrestia

(57) ABSTRACT

A host controller is incorporated with a plurality of different pieces of control software which are applicable to a plurality of destinations for a cooling blower to cool a main battery incorporated in a vehicle. The host controller transmits a destination-signal request pattern for requesting a destination signal pattern to specify the determinations for the cooling blower, to a motor control device by a pulse width modulation (PWM) signal. Upon receiving the destination-signal request pattern, the motor control device transmits the destination signal pattern to the host controller. The host controller specifies one of the destinations for the cooling blower from the received destination signal pattern, and then changes over the control software to the control software applicable to the specified destination for the cooling blower.

8 Claims, 13 Drawing Sheets

(56) References Cited

U.S. PATENT DOCUMENTS

| | | | |
|---|---|---|---|
| 2007/0200518 A1* | 8/2007 | Verge | H05K 7/20209 318/268 |
| 2009/0261767 A1 | 10/2009 | Butler | |
| 2009/0272035 A1* | 11/2009 | Boisvert | B60J 7/0573 49/28 |
| 2010/0312460 A1 | 12/2010 | Yamaguchi | |
| 2011/0106374 A1* | 5/2011 | Margol | G06F 8/61 701/31.4 |
| 2011/0190944 A1 | 8/2011 | Zhao | |
| 2013/0063061 A1* | 3/2013 | Hanada | H02P 27/08 318/400.14 |

FOREIGN PATENT DOCUMENTS

| | | |
|---|---|---|
| JP | 2005-264824 A | 9/2005 |
| JP | 2009-126461 A | 6/2009 |
| JP | 2010-3506 A | 1/2010 |
| JP | 4491106 B2 | 4/2010 |
| JP | 2010-281307 A | 12/2010 |
| JP | 2011-132853 | 7/2011 |
| JP | 2012-44813 A | 3/2012 |

OTHER PUBLICATIONS

People's Republic of China Search Report for Appl. No. 201380002864.0 dated Sep. 3, 2014.
International Search Report for PCT/JP2013/002768, dated Jun. 11, 2013.

* cited by examiner

FIG. 7

| Step No | PWM frequency (Hz) | PWM_Duty(%) | Contents |
|---|---|---|---|
| 0 | 500 | 90 | Destination number (blower model number): 4-digits<br>Duty 5%=0,10%=1,20%=2,30%=3···90%=9 |
| 1 | 510 | 80 | |
| 2 | 520 | 70 | For the case of the left: 9876 |
| 3 | 530 | 60 | |
| 4 | 540 | 5 | Blower individual number (serial number): 8-digits<br>Duty 5%=0,10%=1,20%=2,30%=3···90%=9 |
| 5 | 550 | 5 | |
| 6 | 560 | 5 | For the case of the left: 00000012 |
| 7 | 570 | 5 | |
| 8 | 580 | 5 | |
| 9 | 590 | 5 | |
| 10 | 600 | 10 | |
| 11 | 610 | 20 | |
| 12 | 620 | 20 | Software version number: 4-digits<br>Duty 5%=0,10%=1,20%=2,30%=3···90%=9 |
| 13 | 630 | 30 | |
| 14 | 640 | 40 | For the case of the left: 2345 |
| 15 | 650 | 50 | |

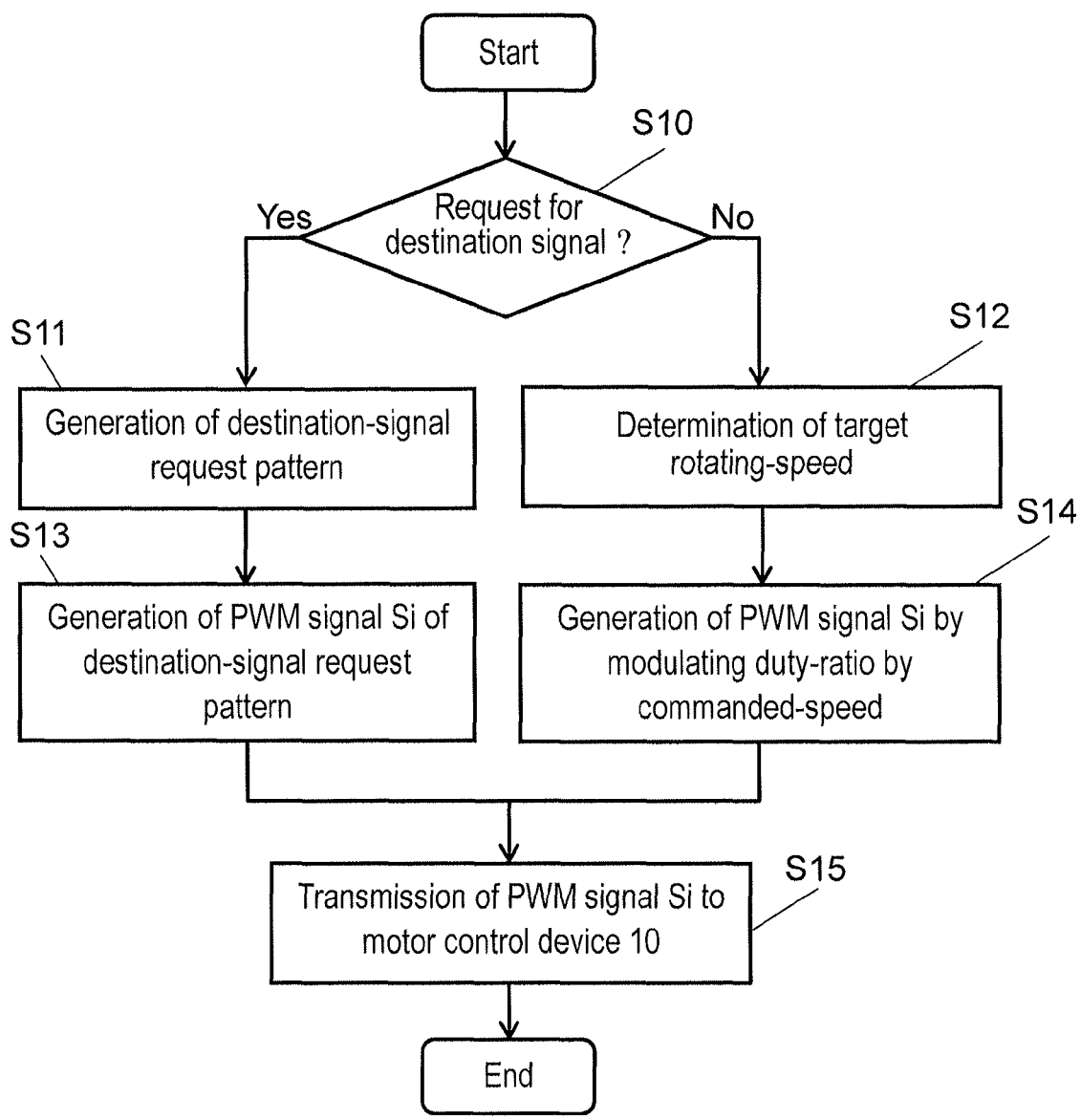

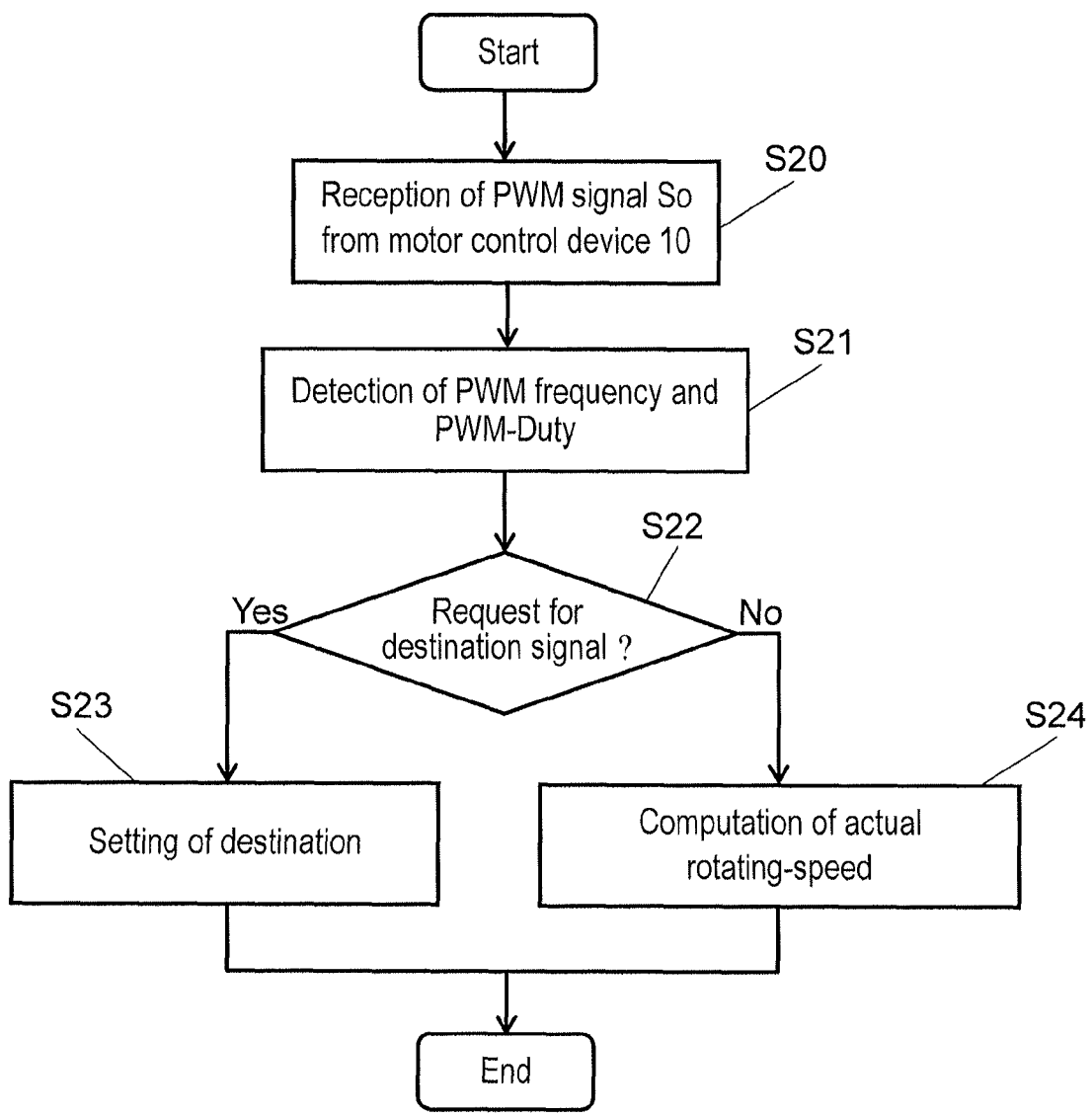

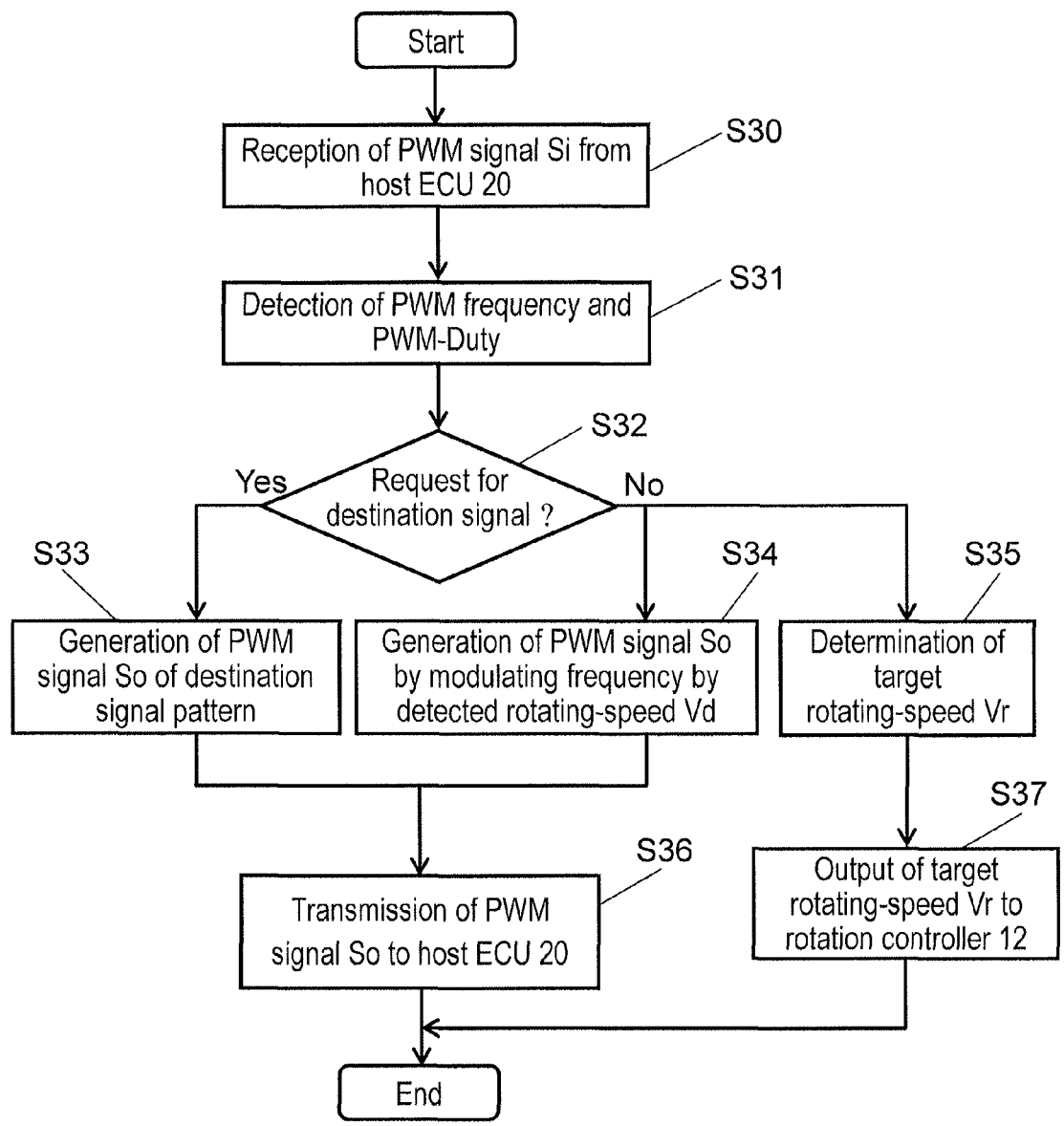

MOTOR CONTROL SYSTEM, METHOD, AND DEVICE FOR CHANGING CONTROL SOFTWARE FOR A VEHICLE COOLING BLOWER

This application is a U.S. National Phase Application of PCT International Application PCT/JP2013/002768.

TECHNICAL FIELD

The present invention relates to motor control systems, motor control methods, and motor control devices for cooling blowers incorporated in vehicles.

BACKGROUND ART

Hybrid vehicles and electric ones are each incorporated with a large battery (main battery) used for driving of the vehicles per se, and use an air-cooling blower to cool the battery. Such the cooling blower is controlled by an instruction received from an electronic control unit (ECU) which controls a wheel driving unit including an engine. The instruction is made regarding cooling capacity (e.g. the rotation number of its fan) of the cooling blower, a cooling period (e.g. a rotation duration time of the fan), and the like.

By the way, the cooling blower has different specifications depending on its destination, which requires different control in accordance with the destination. This requires control software for the ECU which must be changed for each destination. Conventionally, different model numbers have been assigned to the ECUs in accordance with the control software installed in the ECUs even with the same hardware. Before assembling a vehicle, it is confirmed that the model number of the ECU has the correct number different for each destination, and then the ECU with the thus-confirmed model number is assembled. As a result, the number of the ECU model numbers has increased, which requires very complicated management of the model numbers, resulting in a problem of increasing management costs.

To overcome the problem, a method has conventionally been proposed in which a plurality of different pieces of the control software applicable to all of the destinations for in-vehicle electronic equipment is installed in the ECUs with the same model number. When assembling a vehicle, one of the pieces of the control software is used by switching over by using jumper wires, switches, or the like (see Patent Literature 1, for example).

Moreover, as another method for changing the control software, a method has been proposed in which information of the destinations is communicated via a serial communication between the ECU and the electronic equipment (see Patent Literature 2, for example).

However, the conventional methods described above need additional circuit components (CAN transceivers, switches, resistors, etc.) to switch over the control software in accordance with the destination, resulting in increased costs.

CITATION LIST

Patent Literatures

Patent Literature 1: Japanese Patent Unexamined Publication No. 2009-126461

Patent Literature 2: Japanese Patent No. 4491106

SUMMARY OF THE INVENTION

A motor control system according to the present invention includes a motor control device and a host controller. The motor control device controls a motor of a cooling blower for cooling a battery incorporated in a vehicle. The host controller is incorporated with a plurality of different pieces of control software which is applicable to a plurality of destinations for the cooling blower, and transmits and receives control information of the motor to and from the motor control device by means of a PWM signal. The host controller transmits, to the motor control device by means of the PWM signal, a destination-signal request pattern which requests a destination signal pattern for specifying the destination. Upon receiving the destination-signal request pattern, the motor control device transmits the destination signal pattern to the host controller. Then, the host controller specifies one of the destinations for the cooling blower from the destination signal pattern, and switches over to the control software applicable to the specified destination for the cooling blower.

With this configuration, in accordance with the destination, it is possible to easily switch over the cooling-blower control software installed in the host controller, without additional model numbers of the host controller and additional circuit components.

Moreover, a motor control method according to the present invention is one for controlling a motor of a cooling blower for cooling a battery incorporated in a vehicle. In the method, there are included a motor control device for controlling the motor and a host controller incorporated with a plurality of different pieces of control software applicable to a plurality of destinations for the cooling blower, with the host controller transmitting and receiving control information of the motor to and from the motor control device, by means of a PWM signal. The motor control method includes the steps as follows: The host controller transmits, to the motor control device, a destination-signal request pattern which requires a destination signal pattern for specifying the destinations for the cooling blower, by means of the PWM signal. The motor control device receives the PWM signal and determines whether or not the destination-signal request pattern is contained in the PWM signal. The motor control device generates the PWM signal either based on the destination signal pattern when the destination-signal request pattern is contained, or based on actual rotating-speed information of the motor when the destination-signal request pattern is not contained. Then, the motor control device transmits the thus-generated PWM signal to the host controller. The upper controller detects the destination signal pattern from the received PWM signal, specifies one of the destinations for the cooling blower from the detected destination signal pattern, and then switches over to the control software applicable to the specified destination of the cooling blower.

Moreover, a motor control device according to the present invention is one that receives a PWM signal from a host controller, and controls a motor of a cooling blower for cooling a battery incorporated in a vehicle based on the received PWM signal. The motor control device includes: a PWM-signal detecting unit that detects a PWM frequency and a PWM duty ratio of the PWM signal; a request-pattern determination unit that determines, based on an output of the PWM-signal detecting unit, whether or not the detected PWM signal contains a destination-signal request pattern which requests a destination signal pattern for specifying destination for the cooling blower; and a PWM signal generator that generates the PWM signal based on a determination result of the request-pattern determination unit. The PWM signal generator generates the PWM signal either based on the destination signal pattern when the destination-signal request pattern is contained, or based on actual rotating-speed information of the motor when the destination-signal request pattern is not contained. Then, the PWM signal generator transmits the thus-generated PWM signal to the host controller.

In this way, in accordance with the present invention, it is possible to provide the motor control system, motor control method, and motor control device which are capable of easily switching over the cooling-blower control software installed in the ECU to the software applicable to each destination, without the additional model numbers of the ECU and the additional circuit components.

BRIEF DESCRIPTION OF DRAWINGS

FIG. 7 is a table of an example of a destination signal pattern according to the embodiment of the invention.

FIG. 8A is a flow chart of operations of the host ECU according to the embodiment of the invention, when generating the PWM signal.

FIG. 8B is a flow chart of the operations of the host ECU according to the embodiment of the invention, when detecting the PWM signal.

FIG. 9 is a flow chart of operations of the PWM signal processor of the motor control device according to the embodiment of the invention.

DESCRIPTION OF EMBODIMENTS

Hereinafter, descriptions will be made regarding embodiments of the present invention with reference to the accompanying drawings.
(Exemplary Embodiments)

Figure 1:
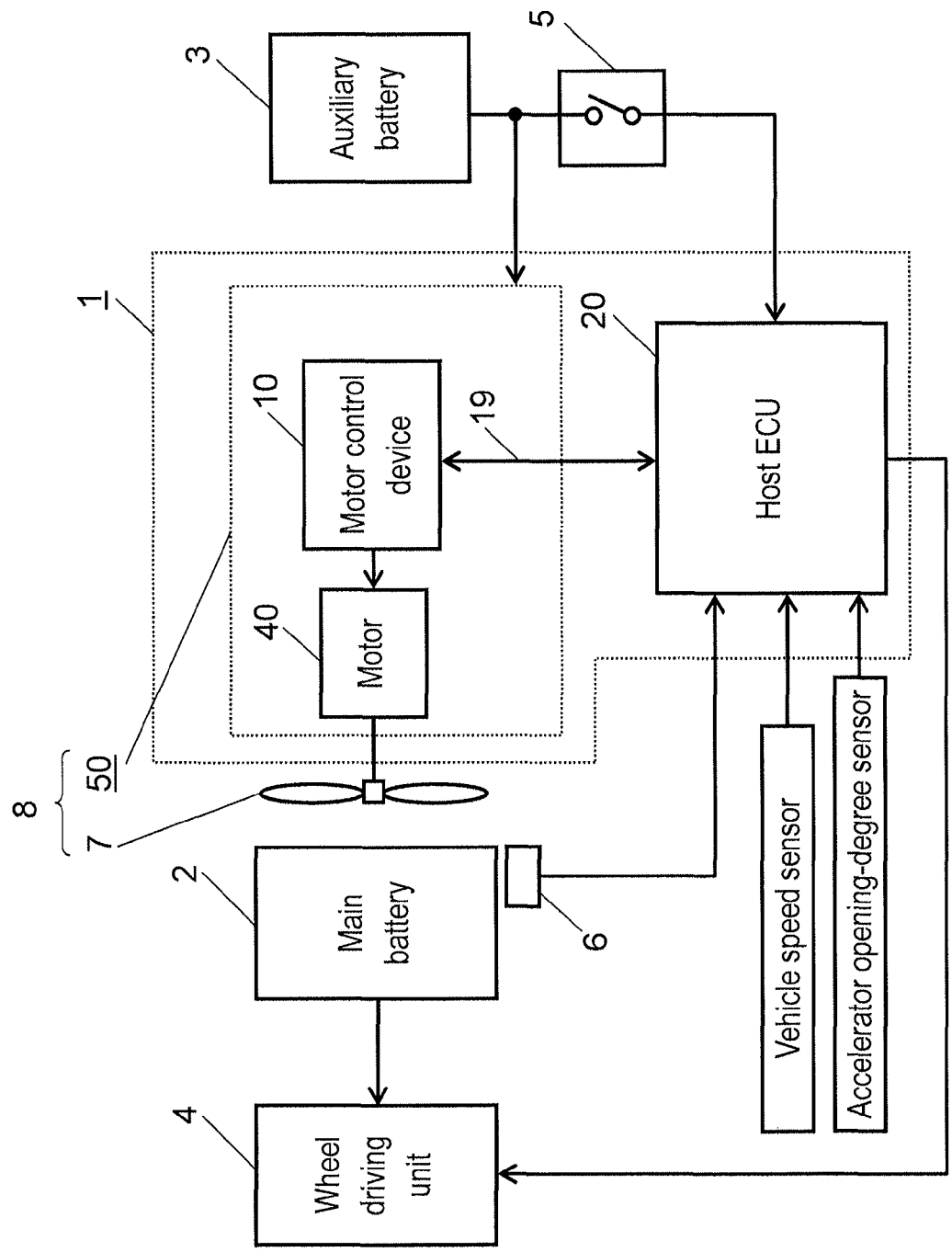
FIG. 1 is a block diagram of a control system of a vehicle including a motor control system according to an embodiment of the present invention.

FIG. 1 is a block diagram of a control system of a vehicle including a motor control system according to an embodiment of the present invention. FIG. 1 shows an exemplary configuration focusing on a cooling blower of an electric vehicle, hybrid vehicle, or the like, and control of the blower. Wheel driving unit 4 such as a wheel driving motor of the vehicle is supplied with electric power from main battery 2. Cooling blower 8 is configured with brushless motor 50 and fan 7 that is rotationally driven by brushless motor 50. Main battery 2 is cooled by air blown from cooling blower 8. Brushless motor 50 is configured with motor 40 and motor control device 10 that controls the rotation of motor 40. Cooling capacity of cooling blower 8 is determined from rotating-speed of motor 40. The rotating-speed of motor 40 is controlled by motor control device 10, by receiving a signal from host controller (hereinafter, referred to as host ECU) 20.

Host ECU 20 controls wheel driving unit 4, an air-conditioner (not shown) inside the vehicle, and the like, based on information from a vehicle speed sensor, and an accelerator opening-degree sensor, etc. Moreover, host ECU 20 controls the cooling capacity of cooling blower 8 based on information from temperature sensor 6 that detects the temperature of main battery 2. Specifically, host ECU 20 transmits, to motor control device 10, command information of a target rotating-speed of motor 40, by means of a PWM signal via PWM signal lines 19. Moreover, host ECU 20 receives a detection information of an actual rotating-speed of motor 40, as actual rotating-speed information, from motor control device 10 by means of a PWM signal via PWM signal lines 19. Note that the rotating-speed of motor 40 as referred herein is the rotation number per unit of time of motor 40.

Host ECU 20 and brushless motor 50 are supplied with electric power from auxiliary battery 3, separately from main battery 2. Note that, in addition to host ECU 20 and brushless motor 50, auxiliary battery 3 supplies electric power to other in-vehicle modules as well including a radio. Here, host ECU 20 is configured to include a microcomputer (referred also to as a micon, hereinafter), ROM, and RAM. Such host ECU 20 operates in accordance with software configured with programs and data. Host ECU 20 is coupled with auxiliary battery 3 via ignition switch (hereinafter, referred to as IG switch) 5. Then, the power is always supplied during driving, i.e. in a state where IG switch 5 is turned on (referred to as ON, hereinafter), but the power is halted during a stop, i.e. in a state where IG switch 5 is turned off (referred to as OFF, hereinafter). On the other hand, brushless motor 50 is coupled directly with auxiliary battery 3 because main battery 2 need to be cooled even in the state where IG switch 5 is OFF.

Figure 2:
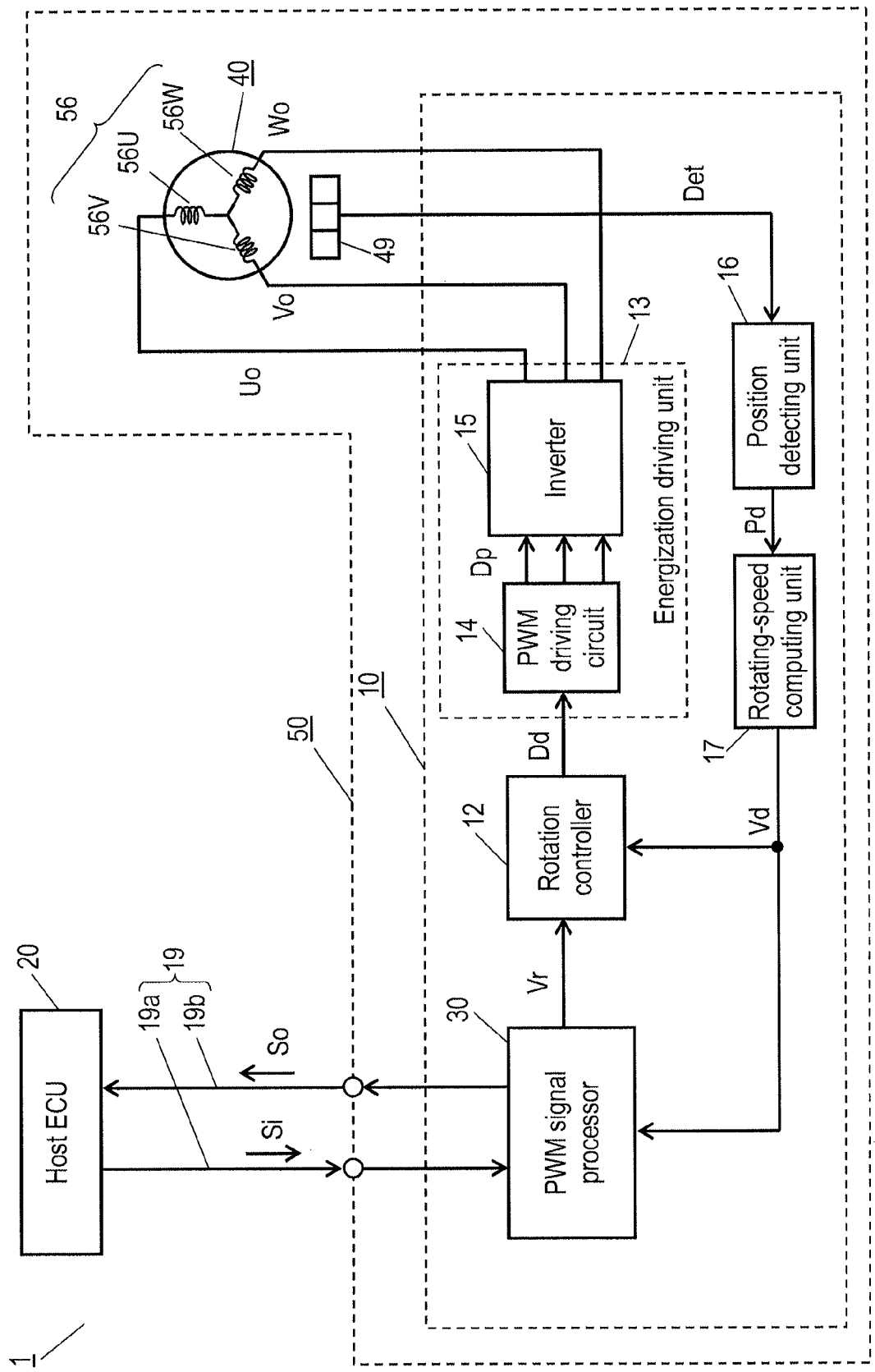
FIG. 2 is a block diagram of a configuration of the motor control system according to the embodiment of the invention.

Next, descriptions will be made regarding a configuration and operations of motor control system 1, with reference to FIGS. 2 to 5. FIG. 2 is a block diagram of the configuration of the motor control system according to the embodiment of the invention.

As shown in FIG. 2, motor control system 1 according to the embodiment is configured to include brushless motor 50 and host ECU 20 that controls brushless motor 50. Moreover, in the embodiment, brushless motor 50 is configured including circuit components mounted thereon which configure motor control device 10. That is, as shown in FIG. 2, in brushless motor 50, motor control device 10 controls the driving of motor 40.

Motor 40 includes a rotor and a stator having windings 56. The rotor rotates by energizing windings 56. In the embodiment, descriptions are made using brushless motor 50, as an example, where motor 40 is driven on a three-phase current which has a U-phase, V-phase, and W-phase different from each other with a 120-degree phase difference. For such the three-phase driving, motor 40 includes winding 56U for driving the U-phase, winding 56V for driving the V-phase, and winding 56W for driving the W-phase.

For each phase, motor control device 10 applies a drive voltage with a predetermined waveform to corresponding winding 56. With this configuration, the rotor rotates at a rotating-speed in accordance with the rotation control from motor control device 10. Moreover, in order to perform such the rotation control, motor 40 is equipped with sensors for detecting a rotating-position and rotating-speed of the rotor. In the embodiment, to detect the rotating-position of the rotor, motor 40 is equipped with three of position detecting sensors 49, such as hall devices, respectively corresponding to the phases. Then, motor control device 10 is supplied with sensor signal Det from position detecting sensors 49.

Moreover, as shown in FIG. 2, motor control device 10 is coupled with host ECU 20 via PWM signal lines 19, for signal communication. Motor control device 10 is notified of a command for controlling the rotation of motor 40, from host ECU 20 via PWM signal line 19a. In reverse, information on brushless motor 50 is notified from motor control device 10 to host ECU 20 via PWM signal line 19b.

In the embodiment, motor control device 10 is notified of the target rotating-speed command, as a command from host ECU 20, which commands a target rotating-speed of motor 40. Moreover, the target rotating-speed thus-commanded by the target rotating-speed command is notified as pulse-width-modulated PWM signal Si, via PWM signal line 19a. In reverse, from motor control device 10, the information on the actual rotating-speed of motor 40 is notified, as pulse-width-modulated PWM signal So, to host ECU 20 via PWM signal line 19b. Here, the rotating-speed as referred herein is the number of revolutions per minute (rpm), for example.

Next, a configuration of motor control device 10 will be described. As shown in FIG. 2, motor control device 10 includes rotation controller 12, PWM driving circuit 14, inverter 15, position detecting unit 16, rotating-speed computing unit 17, and PWM signal processor 30. Then, as described above, motor control device 10 is supplied with sensor signal Det, from three position detecting sensors 49 disposed in motor 40. Moreover, motor control device 10 is coupled with host ECU 20 via PWM signal lines 19a and 19b that transmit PWM signals Si and So, respectively.

First, sensor signal Det from position detecting sensors 49 is supplied to position detecting unit 16. Position detecting unit 16 detects position information for each phase, from sensor signal Det that varies in response to variations in magnetic poles following the rotation of the rotor. For example, position detecting unit 16 detects a timing of zero-crossing of sensor signal Det during the variations in the magnetic poles, and then outputs position detection signal Pd based on the thus-detected timing. That is, the rotating-position of the rotating rotor corresponds to such the detected timing; therefore, the rotating-position can be detected by using the detected timing. Specifically, position detection signal Pd may be a pulse signal that indicates such the detected timing, for example. Position detecting unit 16 supplies, to rotating-speed computing unit 17, position detection signal Pd corresponding to each phase.

Rotating-speed computing unit 17 computes the rotating-speed of the rotor based on the rotating-position indicated by position detection signal Pd, by differential calculation or the like, for example. Rotating-speed computing unit 17 supplies the thus-computed rotating-speed, as detected rotating-speed Vd, on a time-series basis to rotation controller 12. Note that, in the embodiment, the description is made using one example in which detected rotating-speed Vd is generated based on sensor signal Det from position detecting sensors 49. However, the configuration may be such that a rotor-speed is detected by a speed-detection means and detected rotating-speed Vd is generated based on the thus-detected rotor-speed. That is, detected rotating-speed Vd is required only to be values or signals on a time-series basis that indicate the speed detected from the actual rotation of the motor. Based on detected rotating-speed Vd that indicates the actual rotating-speed, PWM signal processor 30 generates PWM signal So by modulating the frequency of the pulse signal, and transmits the resulting signal to host ECU 20.

PWM signal processor 30 receives PWM signal Si transmitted from host ECU 20, and demodulates the pulse-width-modulated pulse signal. Through the demodulation, PWM signal processor 30 reconstructs target rotating-speed Vr on a time-series basis, from thus-received PWM signal Si. That is, PWM signal processor 30 demodulates PWM signal Si by detecting either the pulse width of each pulse of PWM signal Si or a duty ratio corresponding to the pulse width. Then, PWM signal processor 30 outputs, on a time-series basis, target rotating-speed Vr thus-reconstructed by the demodulation.

Target rotating-speed Vr is supplied to rotation controller 12. Moreover, rotation controller 12 is supplied with detected rotating-speed Vd that is computed by rotating-speed computing unit 17. Rotation controller 12 generates driving value Dd that indicates an amount of driving of winding 56, based on both target rotating-speed Vr and detected rotating-speed Vd. Specifically, rotation controller 12 determines a speed deviation between target rotating-speed Vr that indicates the speed command and detected rotating-speed Vd that indicates the detected speed corresponding to the actual speed. Then, rotation controller 12 generates driving value Dd that indicates an amount of torque in accordance with the speed deviation such that the actual speed follows the speed command. Rotation controller 12 supplies such driving value Dd to PWM driving circuit 14.

PWM driving circuit 14 generates a driving waveform to drive winding 56 for each phase, and performs pulse-width modulation on each of the generated driving waveforms to output as drive pulse signal Dp. In the case where winding 56 is driven by sinusoidal-wave driving, the driving waveform is a sinusoidal waveform, while in the case by rectangular-wave driving, the driving waveform is a rectangular waveform. Moreover, the amplitude of the driving waveform is determined in accordance with driving value Dd. PWM driving circuit 14 performs the pulse-width modulation using the driving waveform generated for each phase as a modulating signal, and then supplies drive pulse signal Dp to inverter 15, where drive pulse signal Dp is pulse-width-modulated using the driving waveform and forms a pulse train.

Inverter 15 passes electric current through winding 56 for each phase based on drive pulse signal Dp, so as to energize winding 56 to drive. Inverter 15 is equipped with both a switch element coupled with the positive terminal of the power supply and a switch element coupled with the negative terminal thereof, for each of the U-phase, V-phase, and W-phase. Driving output Uo of the U-phase, driving output Vo of the V-phase, and driving output Wo of the W-phase are coupled with winding 56U, winding 56V, and winding 56W, respectively. In each of the phases, the switch elements are turned ON and OFF in accordance with drive pulse signal Dp. Then, via the switch being ON to the power supply, a driving voltage is further supplied to winding 56 from the driving output. The supply of the driving voltage causes a driving current to pass through winding 56. Here, because drive pulse signal Dp is the signal of the pulse-width-modulated driving waveforms, each of windings 56 is energized by the driving current in accordance with the respective driving waveforms.

Moreover, energization driving unit 13 is configured with PWM driving circuit 14 and inverter 15. As described above, energization driving unit 13 energizes winding 56 of motor 40 to drive, for each phase, based on driving value Dd.

With the configuration described above, a feedback control loop is formed which controls the rotating-speed of the rotor to follow target rotating-speed Vr.

Next, descriptions will be made regarding destination management of control software (hereinafter, referred to as control-soft) installed in host ECU 20 for controlling cooling blower 8. Note that, in the embodiment, although the descriptions will be made regarding the destination management of control-soft, the present invention is not limited to such the destination management. The present invention is also applicable to any application where different pieces of control-soft are changed over, such as an application for model management of cooling blower 8.

Cooling blower 8 has specifications different for each destination thereof, such as the U.S.A., Europe, and China. Motor control device 10 of cooling blower 8 stores a destination signal pattern (information of the destination) for specifying the destination of its own. In order to transmit proper control information to motor control device 10, host ECU 20 needs to acquire the destination signal pattern from motor control device 10 in advance of the transmission of the control information. To this end, host ECU 20 embeds, into PWM signal Si, a destination-signal request pattern which requests the destination signal pattern from motor control device 10, and then transmits the signal. Motor control device 10 always monitors PWM signal Si received from host ECU 20 to see whether or not the PWM signal contains the destination-signal request pattern. When PWM signal Si contains the destination-signal request pattern, motor control device 10 reads the destination signal pattern from its own memory or the like, and embeds the destination signal pattern into PWM signal So to transmit to host ECU 20. Host ECU 20 extracts the destination signal pattern from received PWM signal So, and changes over to the control-soft applicable to the destination based on the destination signal pattern.

Figure 3:
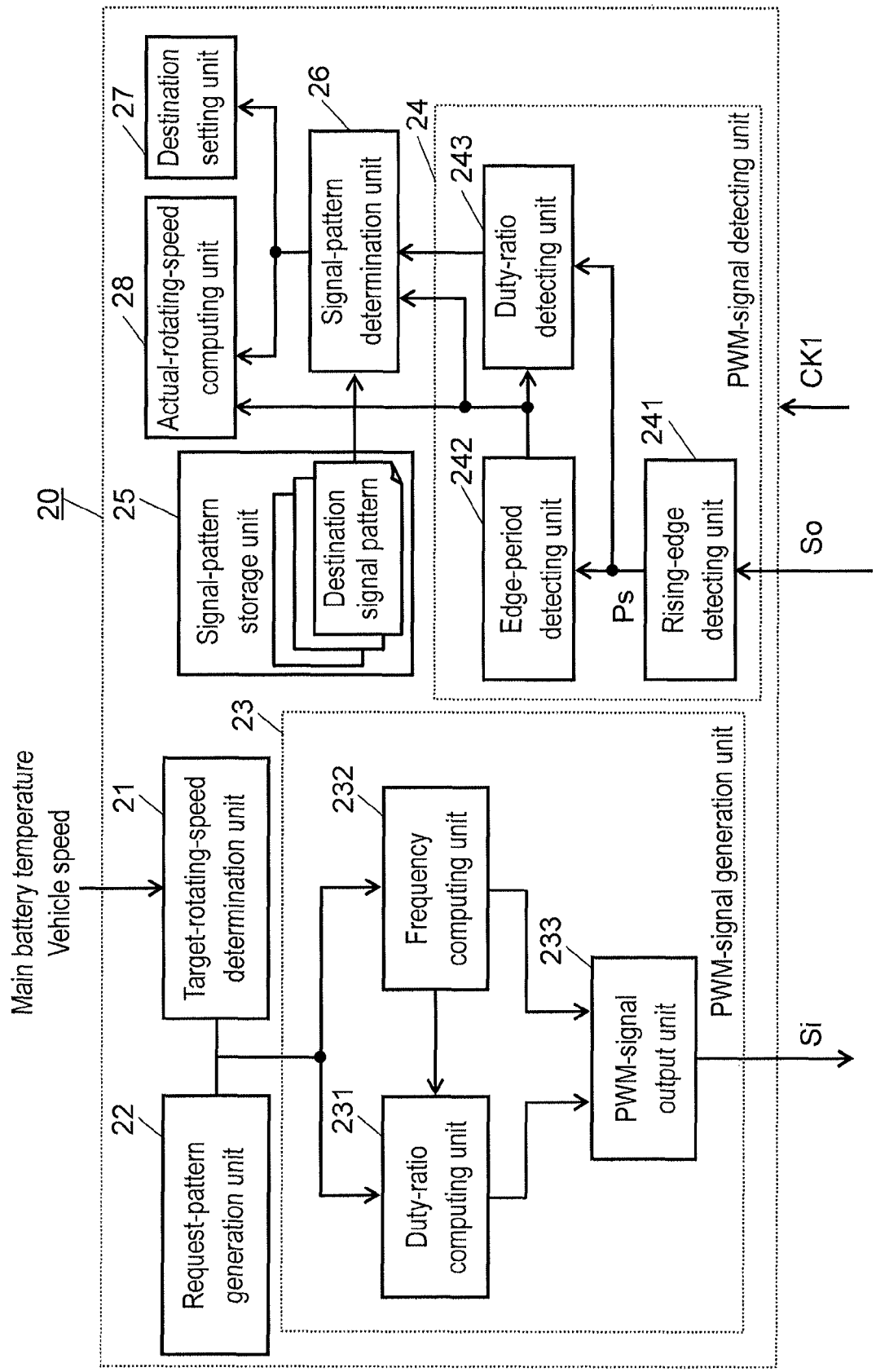
FIG. 3 is a functional block diagram of a host ECU according to the embodiment of the invention.
Figure 4:
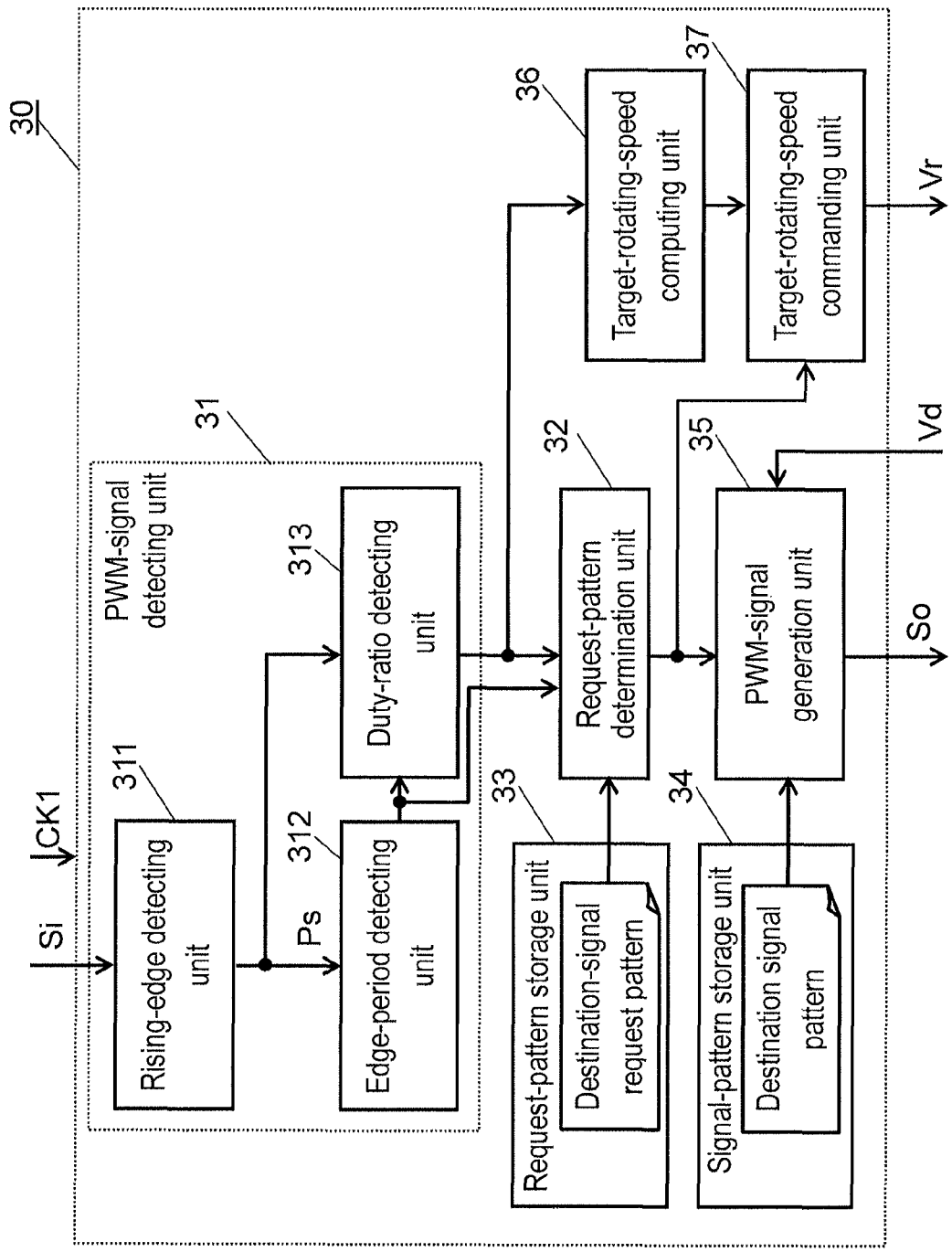
FIG. 4 is a functional block diagram of a PWM signal processor of a motor control device according to the embodiment of the invention.
Figure 5:
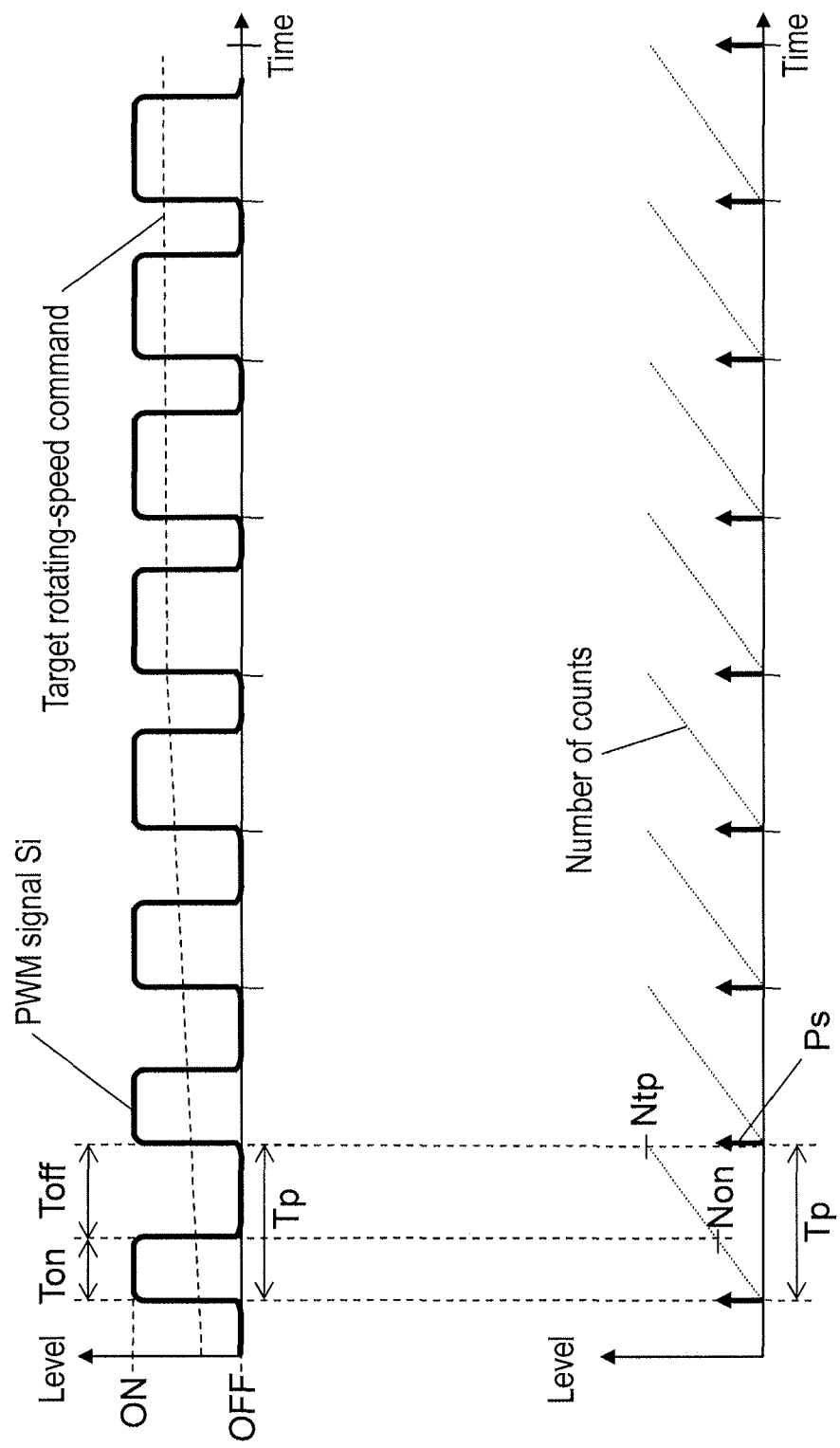
FIG. 5 is a signal waveform chart of an example of a PWM signal according to the embodiment of the invention.

Next, descriptions will be made regarding detailed configurations of both host ECU 20 and PWM signal processor 30 of motor control device 10, with reference to FIGS. 3 to 5. FIG. 3 is a functional block diagram of the host ECU according to the embodiment of the invention. FIG. 4 is a functional block diagram of the PWM signal processor of the motor control device according to the embodiment of the invention. FIG. 5 is a signal waveform chart of an example of the PWM signal according to the embodiment of the invention. In the upper-row of FIG. 5, the solid line represents a waveform of PWM signal Si, while the dashed line represents a target rotating-speed command. In the lower-row of FIG. 5, the solid line represents a timing of pulse start signal Ps. Note, however, that FIG. 3 shows the configuration involved only in the controlling of cooling blower 8.

As shown in FIGS. 3 and 4, host ECU 20 and PWM signal processor 30 are supplied with clock signal Ck1. Clock signal Ck1 is a pulse signal with a constant period and a frequency sufficiently higher than those of PWM signals Si and So. For example, when the frequencies of PWM signals Si and So are 500 Hz, the frequency of clock signal Ck1 is approximately 1 MHz. Moreover, in the configuration shown in FIG. 3, an example of the configuration is described in which PWM signals Si and So are generated by utilizing a counter that counts clock signal Ck1.

As shown in FIG. 3, host ECU 20 includes target-rotating-speed determination unit 21, request-pattern generation unit 22, PWM-signal generation unit 23, PWM-signal detecting unit 24, signal-pattern storage unit 25, signal-pattern determination unit 26, destination setting unit 27, and actual-rotating-speed computing unit 28. PWM-signal generation unit 23 is configured with duty-ratio computing unit 231, frequency computing unit 232, and PWM-signal output unit 233. Moreover, PWM-signal detecting unit 24 includes rising-edge detecting unit 241, edge-period detecting unit 242, and duty-ratio detecting unit 243.

First, with reference to FIGS. 3 and 5, descriptions are made regarding a block configuration of host ECU 20, in which PWM signal Si is generated. To begin with, in normal operation, target-rotating-speed determination unit 21 determines the target rotating-speed of motor 40 based on the temperature of main battery 2 informed from temperature sensor 6 and on the vehicle speed informed from the vehicle speed sensor, and then supplies the target rotating-speed command to duty-ratio computing unit 231. Duty-ratio computing unit 231 computes the pulse width of each pulse of the PWM signal in accordance with the target rotating-speed command, and then supplies the resulting pulse widths to PWM-signal output unit 233. Here, the target rotating-speed as referred herein is the number of revolutions per unit time. By changing the duty ratio, the target revolution number (rpm) is changed within a range from 10% to 90%. On the other hand, at start-up of host ECU 20, request-pattern generation unit 22 generates the destination-signal request pattern that is predetermined, and supplies it to duty-ratio computing unit 231 and frequency computing unit 232. Duty-ratio computing unit 231 and frequency computing unit 232 compute the following items of the PWM signal in accordance with the destination-signal request pattern. That is, the frequency of the PWM signal (also referred to as the PWM frequency, hereinafter), i.e. the period of each pulse, and the duty ratio (also referred to as the PWM duty ratio, abbreviated to the "PWM-Duty," hereinafter). Then, both the units supply the thus-computed results to PWM-signal output unit 233. PWM-signal output unit 233 generates PWM signal Si based on the computed information from both duty-ratio computing unit 231 and frequency computing unit 232, and then transmits the signal to motor control device 10. Here, the start-up of host ECU 20 as referred herein is the point in time at which IG switch 5 is turned ON to supply the power to host ECU 20. Moreover, details of the destination-signal request pattern will be described later. Note that, although it has been described that the input of the destination-signal request pattern from request-pattern generation unit 22 to PWM-signal generation unit 23 is performed at the start-up of host ECU 20, the input may be once performed when cooling blower 8 is attached to the vehicle.

As shown in the upper-row of FIG. 5, PWM signal Si is a pulse train with period Tp. The time period of period Tp is composed of ON-time period Ton for a high level and OFF-time period Toff for a low level. The duty ratio (Ton/Tp), a ratio of ON-time period Ton to period Tp, is modulated by the target rotating-speed. For example, PWM-signal output unit 233 generates PWM signal Si that is a pulse-train signal where the duty ratio gradually increases a level of the target rotating-speed command gradually increases (the target rotating-speed increases from a lower speed to a higher speed).

Next, with reference to FIG. 4, descriptions will be made in detail regarding a configuration and operations of PWM signal processor 30 of motor control device 10. As shown in FIG. 4, PWM signal processor 30 includes PWM-signal detecting unit 31, request-pattern determination unit 32, request-pattern storage unit 33, signal-pattern storage unit 34, PWM-signal generation unit 35, target-rotating-speed computing unit 36, and target-rotating-speed commanding unit 37. PWM-signal detecting unit 31 is composed of rising-edge detecting unit 311, edge-period detecting unit 312, and duty-ratio detecting unit 313.

Rising-edge detecting unit 311 detects a timing of a rising edge, from OFF to ON, of each of the pulses of PWM signal Si, and then generates edge-detection signal Ps based on the timing. The timing of edge-detection signal Ps corresponds to the starting timing of each of the pulses that configure PWM signal Si, as shown in the lower-row of FIG. 5. The thus-generated edge-detection signal Ps is supplied to edge-period detecting unit 312 and duty-ratio detecting unit 313. In the embodiment, rising-edge detecting unit 311 performing such the operation has been described, as an example of an edge-timing detecting means which detects the timing of the edge that varies in a predetermined direction.

Edge-period detecting unit 312 detects the period of edge-detection signal Ps that is sequentially supplied from rising-edge detecting unit 311. In the exemplary configuration, edge-period detecting unit 312 includes a counter which counts the number of clock signal Ck1. Then, the counter counts the number of the clocks present between edge-detection signals Ps so as to detect the period of edge-detection signal Ps. The counter of edge-period detecting unit 312 performs such the operation to detect number-of-counts Ntp of the time period of period Tp, as shown in the lower-row of FIG. 5. Thus-detected number-of-counts Ntp corresponds to period Tp of each of the pulses that configure PWM signal Si. Edge-period detecting unit 312 supplies the thus-detected period (frequency) of the pulses to request-pattern determination unit 32. In the exemplary configuration, duty-ratio detecting unit 313 includes a counter which counts the number of clock signal Ck1. As shown in the lower-row of FIG. 5, the counter of duty-ratio detecting unit 313 starts the counting at a timing of edge-detection signal Ps, and continues the counting operation during ON-time period Ton of PWM signal Si to detect number-of-counts Non of ON-time period Ton. Moreover, duty-ratio detecting unit 313 computes a ratio of number-of-counts Non to number-of-counts Ntp. The ratio corresponds to the duty ratio of PWM signal Si. Duty-ratio detecting unit 313 supplies the detected duty ratio to request-pattern determination unit 32 and target-rotating-speed computing unit 36.

Request-pattern storage unit 33 stores the destination-signal request pattern that is generated based on a predetermined PWM frequency, PWM-Duty, and signal output time. Signal-pattern storage unit 34 stores the destination signal pattern that is generated based on a PWM frequency, PWM-Duty, and signal output time which are predetermined to specify the destination of cooling blower 8 of its own.

Request-pattern determination unit 32 reads the destination-signal request pattern from request-pattern storage unit 33, compares it with the signal pattern of received PWM signal Si to determine (detect) whether or not PWM signal Si contains the destination-signal request pattern, and then supplies the determination result to PWM-signal generation unit 35.

PWM-signal generation unit 35 generates PWM signal So based on the determination result of request-pattern determination unit 32, and transmits it to host ECU 20. That is, when request-pattern determination unit 32 detects the destination-signal request pattern, PWM-signal generation unit 35 reads the destination signal pattern from signal-pattern storage unit 34, and generates PWM signal So based on the destination signal pattern. On the other hand, when request-pattern determination unit 32 does not detect the destination-signal request pattern, PWM-signal generation unit 35 modulates the frequency of the pulse signal by detected rotating-speed Vd of motor 40 supplied from rotating-speed computing unit 17 so as to generate PWM signal So. Detailed operations of request-pattern determination unit 32 will be described later.

Target-rotating-speed computing unit 36 receives the duty ratio from duty-ratio detecting unit 313, and computes to reconstruct target rotating-speed Vr of motor 40 to reconstruct Vr. For example, in the lower-row of FIG. 5, assuming that number-of-counts Ntp is 2000 and number-of-counts Non is 1000, then the ratio is 0.5, that is, the duty ratio is 50%. Target-rotating-speed computing unit 36 reconstructs target rotating-speed Vr in such a manner that, for example, it is 1000 (rpm) for a 50% duty ratio and 500 (rpm) for a 25% duty ratio.

Target-rotating-speed commanding unit 37 receives target rotating-speed Vr from target-rotating-speed computing unit 36. When request-pattern determination unit 32 does not detect the destination-signal request pattern, the target-rotating-speed commanding unit outputs target rotating-speed Vr as it is. On the other hand, when request-pattern determination unit 32 detects the destination-signal request pattern, the target-rotating-speed commanding unit outputs target rotating-speed Vr that equals zero or a predetermined fixed value, to halt the rotation of motor 40.

Next, again with reference to FIG. 3, descriptions will be made regarding a block configuration, in which PWM signal So of host ECU 20 is detected. PWM-signal detecting unit 24 detects the PWM frequency and PWM-Duty from PWM signal So that is received from motor control device 10. Then, PWM-signal detecting unit 24 supplies the detected PWM frequency to actual-rotating-speed computing unit 28, and supplies both the detected PWM frequency and PWM-Duty to signal-pattern determination unit 26. Operations of PWM-signal detecting unit 24 are similar to those of PWM-signal detecting unit 31 described in FIG. 4; therefore, the description thereof is omitted.

Signal-pattern storage unit 25 stores the destination signal patterns that are applicable to all of the destinations for cooling blower 8.

Signal-pattern determination unit 26 compares the signal pattern contained in PWM signal So with all the destination signal patterns read from signal-pattern storage unit 25. Then, signal-pattern determination unit 26 determines whether or not PWM signal So is the destination signal pattern. When it is determined that PWM signal So is the destination signal pattern, signal-pattern determination unit 26 determines to which destination the destination signal pattern is applicable (where the destination for cooling blower 8 is). Signal-pattern determination unit 26 supplies the determination result to both destination setting unit 27 and actual-rotating-speed computing unit 28.

When PWM signal So is not the destination signal pattern, that is, host ECU 20 is in a normal operation mode, actual-rotating-speed computing unit 28 reconstructs the actual rotating-speed of motor 40 from the PWM frequency supplied from edge-period detecting unit 242. Host ECU 20 utilizes the reconstructed actual rotating-speed to control motor 40.

Destination setting unit 27 changes over from a plurality of pieces of the control-soft installed in host ECU 20 to the control-soft applicable to the destination for cooling blower 8 incorporated in the vehicle.

Figure 6:
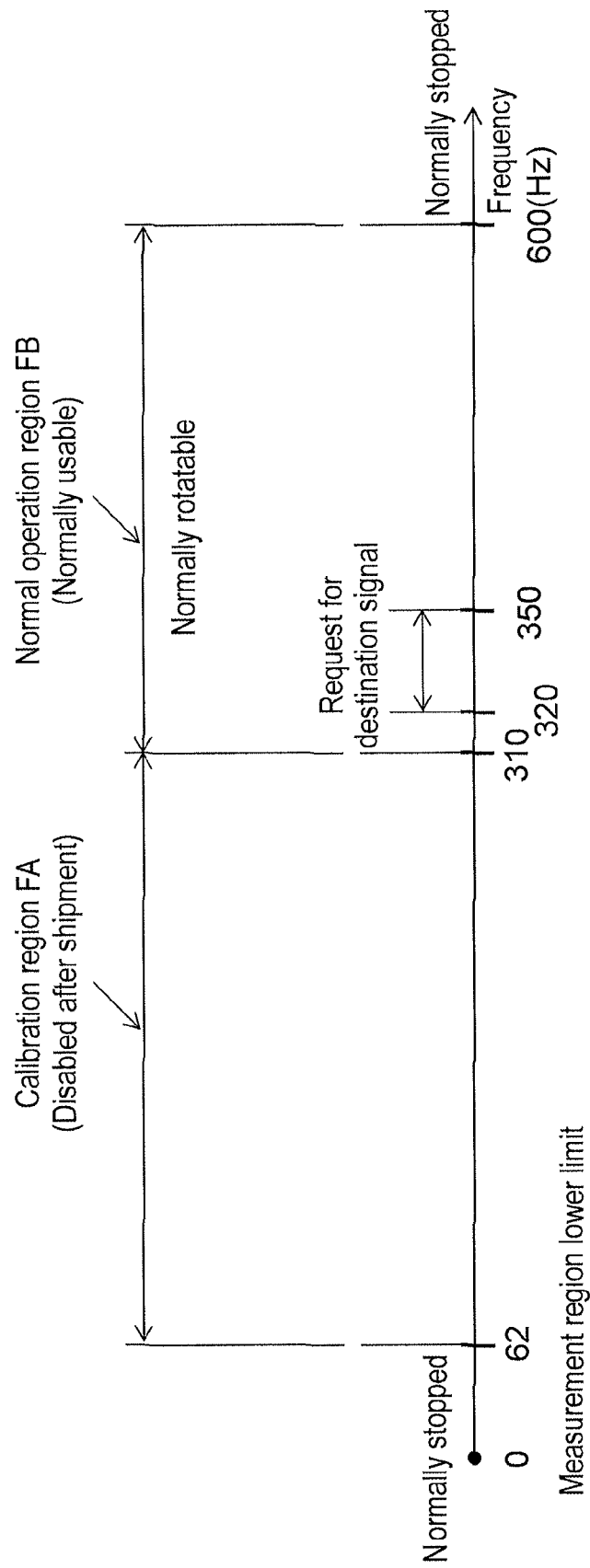
FIG. 6 is a view of an example of a frequency allocation of the PWM signal according to the embodiment of the invention.

Next, with reference to FIGS. 6 and 7, descriptions will be made regarding the destination signal pattern and the destination-signal request pattern, using a specific example. FIG. 6 is a figure illustrating an example of a frequency allocation of PWM signal Si. As shown in FIG. 6, in the embodiment, a region from 62 Hz to 310 Hz is calibration region FA, while a region from 310 Hz to 600 Hz is normal operation region FB. Other regions are forbidden regions in which motor 40 is always stopped. In calibration region FA, a calibration operation is performed to allow motor 40 to operate normally. A region from 320 Hz to 350 Hz in normal operation region FB is allocated for requesting the destination signal.

FIG. 7 is a table of an example of the destination signal pattern according to the embodiment. As shown in FIG. 7, for example, the destination signal pattern may be configured in such a manner that: Destination numbers (blower model numbers) are represented by four digits which correspond to four steps No. 0 to No. 3, ranging 500 Hz to 530 Hz (increasing every 10 Hz), of the PWM frequency. Blower individual numbers (serial numbers) are represented by eight digits which correspond to eight steps No. 4 to No. 11, ranging 540 Hz to 610 Hz (increasing every 10 Hz), of the PWM frequency. Software version numbers of the controlsoft are represented by four digits which correspond to four steps No. 12 to No. 15, ranging 620 Hz to 650 Hz (increasing every 10 Hz), of the PWM frequency. Moreover, the numeric value (number) of each of the digits may be represented by the PWM-Duty in such a manner that, for example, 5% of the PWM-Duty represents the value zero, and steps (increasing every 10%) of the PWM-Duty from 10% to 90% represent the values 1 to 9, respectively.

Moreover, each of steps No. 0 to No. 15 of the destination signal lasts one second, that is, the destination signal lasts 16 seconds in total. Consequently, each digit of the destination signal pattern is determined from both the signal output time and the PWM frequency. According to the definition in this way of the destination signal pattern, for the case of FIG. 7, it is understood that the destination number is 9876, the blower individual number is 00000012, and the software version number is 2345. In this way, the combination of the three items, i.e. the PWM frequency, the PWM-Duty, and the signal output time, allows the more reliable transmission of the information of cooling blower 8 to host ECU 20, by means of PWM signal So.

Figure 10:
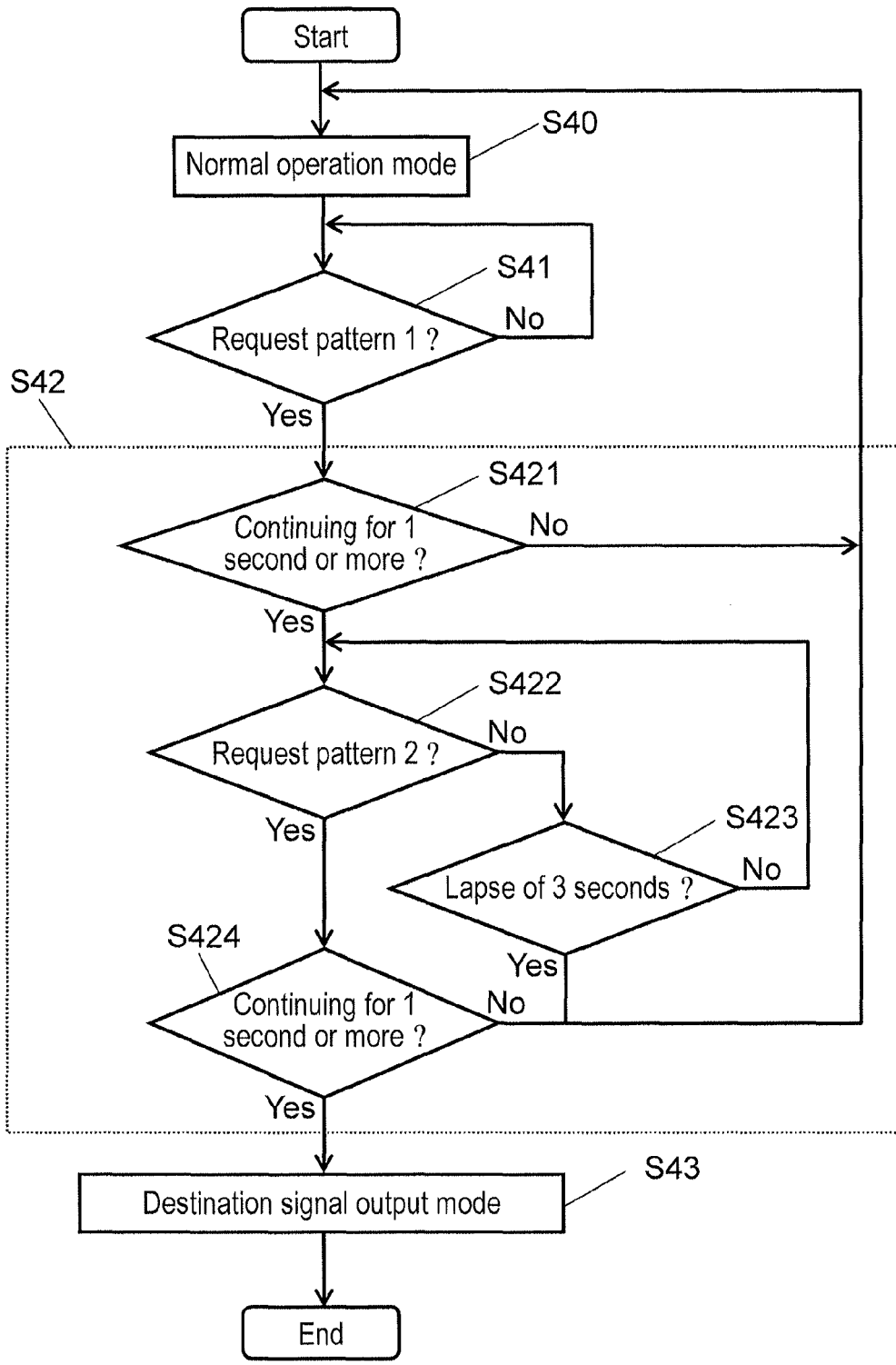
FIG. 10 is a flow chart of a mode shifting operation of the PWM signal processor of the motor control device according to the embodiment of the invention.
Figure 11:
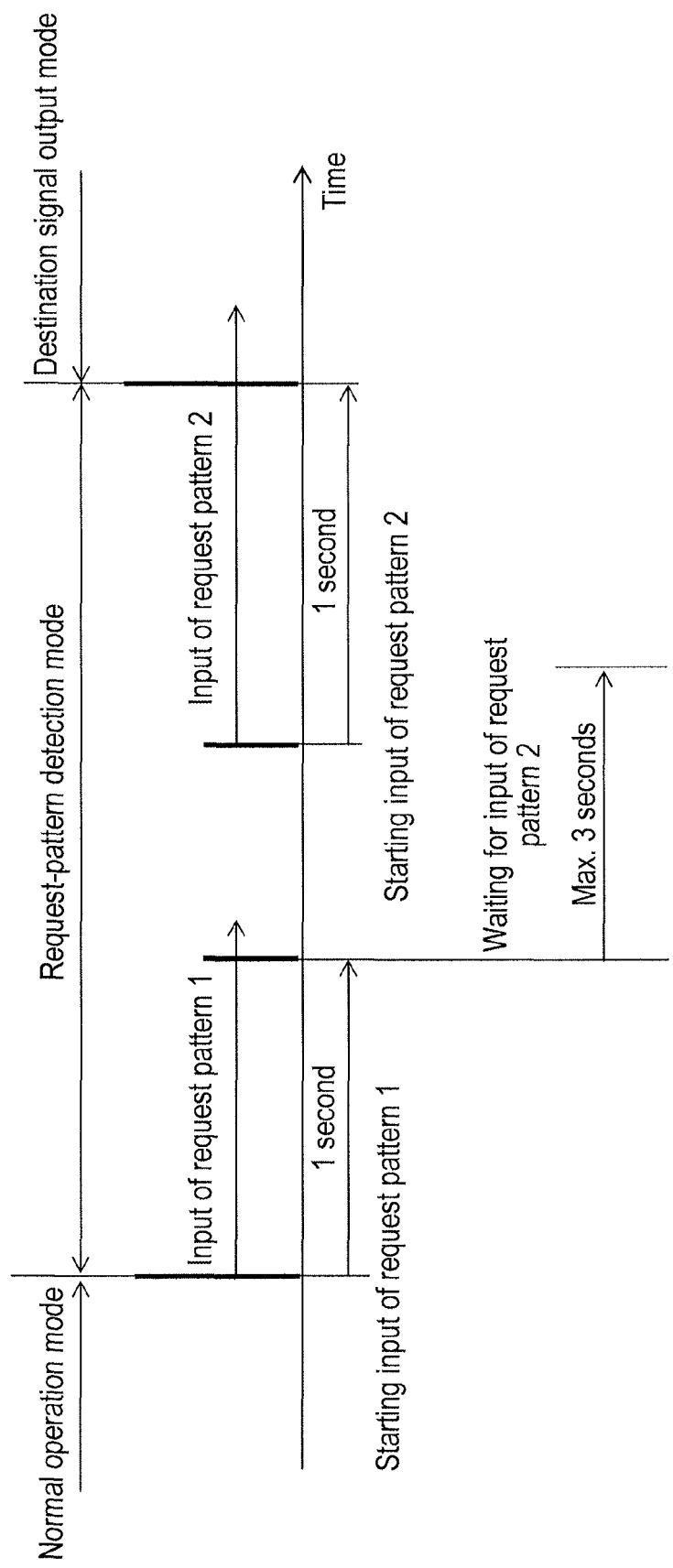
FIG. 11 is a timing diagram for illustrating the mode shifting operation of the PWM signal processor of the motor control device according to the embodiment of the invention.

Next, descriptions will be made regarding operations of host ECU 20 and motor control device 10, with reference to FIGS. 8A and 8B to 11. FIGS. 8A and 8B are flow-charts of the operations of the host ECU according to the embodiment. FIG. 8A shows the operations in which the PWM signal is generated, while FIG. 8B shows the operations in which the PWM signal is detected. FIG. 9 is a flow chart of operations of the motor control device according to the embodiment. FIG. 10 is a flow chart of operations of the request-pattern determination unit according to the embodiment. FIG. 11 is a timing diagram for illustrating a relation among operation modes of the motor control device.

First, as shown in FIG. 8A, host ECU 20 starts by determining whether or not it requests the destination signal pattern of cooling blower 8 (Step S10). When, such as at start-up, host ECU 20 requests the destination signal pattern (when Yes), request-pattern generation unit 22 generates the destination-signal request pattern (Step S11), and then PWM-signal generation unit 23 generates PWM signal Si based on the destination-signal request pattern (Step S13). On the other hand, when being in the normal operation mode where host ECU 20 does not request the destination signal pattern (when No), target-rotating-speed determination unit 21 determines the target rotating-speed of motor 40 from the information of the temperature of main battery 2 and the vehicle speed (Step S12), and then PWM-signal generation unit 23 generates PWM signal Si by modulating the duty ratio of the pulse signal by the target rotating-speed (Step S14). Next, in Step S15, host ECU 20 transmits PWM signal Si to motor control device 10.

Next, as shown in FIG. 9, motor control device 10 receives PWM signal Si from host ECU 20 (Step S30), and then PWM-signal detecting unit 31 detects both the PWM frequency and the PWM-Duty (Step S31). After that, request-pattern determination unit 32 determines whether or not PWM signal So contains the destination-signal request pattern (Step S32). Details of operations of request-pattern determination unit 32 will be described with reference to FIGS. 10 and 11.

As shown in FIGS. 10 and 11, during the operation in the normal operation mode (Step S40), request-pattern determination unit 32 starts by determining whether or not PWM signal So contains request pattern 1 (Step S41). Here, request pattern 1 is a PWM-signal pattern in which the PWM frequency is 320 Hz±1%, and the PWM-Duty is 10%±1%, for example. When request pattern 1 is detected (Yes in Step S41), the step shifts to a request-pattern detection mode (Step S42). When request pattern 1 is not detected (No in Step S41), the step of detecting request pattern 1 is repeated. In the request-pattern detection mode (Step S42), it is determined whether or not request pattern 1 is inputted continuously for not less than one second (Step S421). When request pattern 1 is inputted continuously for not less than one second (when Yes), the step proceeds to wait for request pattern 2 being detected (Step S422). Here, request pattern 2 is a PWM-signal pattern in which the PWM frequency is 350 Hz±1%, and the PWM-Duty is 10%±1%, for example.

When request pattern 2 is detected (Yes in Step S422) and is inputted continuously for not less than one second (Yes in Step S424), the step shifts to a destination signal output mode (Step S43) to end. On the other hand, when request pattern 2 is not detected even in three seconds (Yes in Step 5423) or request pattern 2 is detected but not inputted continuously for not less than one second (No in Step 424), the step returns to the normal operation mode (Step S40). Moreover, when an out-of-the-range signal pattern of the PWM frequency and PWM-Duty is inputted during the input of request pattern 1 or 2 (one second for each), the step returns to the normal operation mode. On the other hand, in the state of waiting for request pattern 2 being inputted, even when an out-of-the-range PWM-signal pattern is inputted, the step does not return to the normal operation mode until three seconds pass. Note that, because the PWM-Duty is 10% during the input of request pattern 1 or 2, motor 40 halts.

Returning again to FIG. 9, in Step S32, when request-pattern determination unit 32 determines that the destination-signal request pattern is contained (when Yes), PWM-signal generation unit 35 generates PWM signal So based on the destination signal pattern (Step S33). On the other hand, in Step S32, when request-pattern determination unit 32 determines that the destination-signal request pattern is not contained (when No), PWM-signal generation unit 35 generates PWM signal So by modulating the frequency of the pulse signal by detected rotating-speed Vd supplied from rotating-speed computing unit 17. After that, the PWM-signal generation unit transmits PWM signal So to host ECU 20. At the same time, target-rotating-speed computing unit 36 computes target rotating-speed Vr based on the detected PWM-Duty (Step S35), and then target-rotating-speed commanding unit 37 outputs thus-computed target rotating-speed Vr to rotation controller 12.

Next, operations of host ECU 20 when detecting the PWM signal will be described, with reference to FIG. 8B. As shown in FIG. 8B, when host ECU 20 receives PWM signal So (Step S20), PWM-signal detecting unit 24 detects the PWM frequency and PWM-Duty from PWM signal So (Step S21). Signal-pattern determination unit 26 determines whether or not PWM signal So contains the destination signal pattern (Step S22). When the destination signal pattern is detected (when Yes), destination setting unit 27 changes over the control-soft of host ECU 20 to the control-soft applicable to cooling blower 8 that is currently incorporated in the vehicle. On the other hand, in Step S22, when signal-pattern determination unit 26 does not detect the destination signal pattern (when No), the determination unit determines that the step is in the normal operation mode, and actual-rotating-speed computing unit 28 computes the actual rotating-speed from the detected PWM frequency. Host ECU 20 utilizes the computed actual rotating-speed to control cooling blower 8.

Note that, in the above descriptions, although PWM signal processor 30 has been described using one example of the configuration that uses the counter or the like, it is also possible to configure the processor using a microcomputer or the like. That is, the configuration may be such that a program is installed which has the same functions as those of PWM signal processor 30 as described above, and the processes described above are performed with the program. Moreover, in the exemplary configuration described above, the descriptions have been made using one example where the pulse widths in the ON-time periods are modulated relative to the rising-edges of the pluses. However, the configuration may be such that a modulation is performed relative to the falling-edges of the pluses, or performed on the pulse widths in the OFF-time periods.

Next, a detailed configuration of brushless motor 50 will be described.

Figure 12:
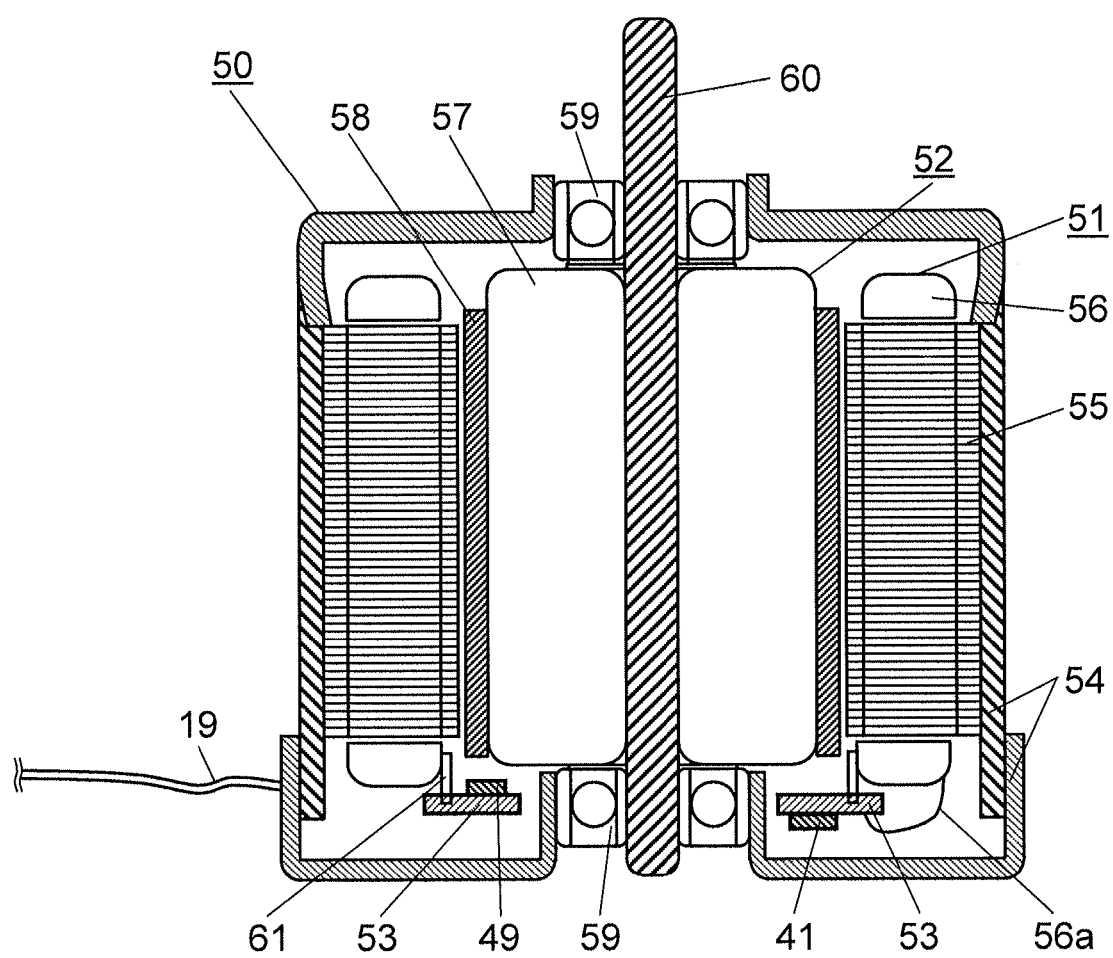
FIG. 12 is a cross-sectional view of a brushless motor according to the embodiment of the invention.

FIG. 12 is a cross-sectional view of brushless motor 50 according to the embodiment of the present invention. In the embodiment, descriptions are made using an example of inner-rotor type brushless motor 50 in which a rotor is rotatably disposed in the inner peripheral side of a stator.

As shown in FIG. 12, brushless motor 50 includes stator 51, rotor 52, circuit board 53, and motor case 54. Motor case 54 is formed with a metal cylinder which is hermetically sealed. Brushless motor 50 is configured such that motor case 54 accommodates stator 51, rotor 52, and circuit board 53.

In FIG. 12, stator 51 is configured such that winding 56 for each phase is wound on stator iron-core 55. Stator iron-core 55 includes a plurality of protruded poles which protrude toward the inner peripheral side of the core. Moreover, the outer peripheral side of stator iron-core 55 has an approximately cylindrical shape, and the outer periphery thereof is secured to motor case 54. In the inside of stator 51, rotor 52 is inserted with a gap. Rotor 52 holds cylindrical permanent magnet 58 at the outer periphery of rotor frame 57 and is rotatably disposed around rotary shaft 60 supported by shaft bearing 59. That is, the end surfaces of the salient poles and the outer peripheral surface of permanent magnet 58 are disposed to face each other. Motor 40 is composed of such stator 51 and rotor 52 supported by shaft bearing 59.

Moreover, brushless motor 50 accommodates, in the inside of motor case 54, circuit board 53 on which various circuit components 41 are mounted. These circuit components 41 specifically configure motor control device 10 to control and drive motor 40. Moreover, position detecting sensors 49, composed of such as hall devices, are also mounted on circuit board 53 to detect the rotating-position of rotor 52. Stator iron-core 55 is equipped with support member 61, and circuit board 53 is secured in the inside of motor case 54 via support member 61. Then, the end parts of each of windings 56U, 56V, and 56W are lead out from stator 51, as lead wires 56a. Lead wires 56a of the respective windings are coupled with circuit board 53.

Moreover, from brushless motor 50, PWM signal lines 19 coupled with host ECU 20 are drawn.

For thus-configured brushless motor 50, the power supply voltage and PWM signal Si are supplied from the outside to allow motor control device 10 configured on circuit board 53 to pass the driving current through windings 56, which results in the generation of a magnetic field from stator iron-core 55. Then, both the magnetic field from stator iron-core 55 and the magnetic field from permanent magnet 58 generate an attractive force or a repulsive force in accordance with the polarities of these magnetic fields, which causes rotor 52 to rotate about rotary shaft 60.

As described above, in motor control system 1 according to the embodiment, the information of the destination for cooling blower 8 is communicated between host ECU 20 and motor control device 10 by using PWM signal lines 19. This eliminates the need of jumper wires/switches for switching over the control-soft, which allows the reduced component count of host ECU 20 and the simplified shape of the case, resulting in reduced costs. In addition, no use of switches eliminates any possible trouble involved in such as a malfunction of the switches and a drop of the switches. Therefore, host ECU 20 is improved in resistance to vibrations. Moreover, there is no need for a serial communication function between host ECU 20 and motor control device 10, which allows motor control device 10 to be configured by using cheap ICs and a microcomputer with low specifications. Furthermore, this also eliminates the need of electronic components (CAN transceivers, choke coils, high-precision clocks, etc.) used for the serial communication, resulting in reduced costs.

In addition, the signal output time is added to the combination of the PWM frequency and the PWM-Duty, which results in improved resistance to external noises. Also, it is possible to differentiate the board and cooling blower 8 from other ones which have no difference in appearance except for in control-soft specifications different from those of other ones. This allows a reduction in misassembling of the circuits in production lines. That is, for cooling blower 8 according to the embodiment, it is possible to detect its destination and product specifications before assigning a QR Code (registered trademark) to it, which results in a reduction in costs for possible re-working of the misassembled products.

INDUSTRIAL APPLICABILITY

The motor control system, motor control method, and motor control device according to the present invention are preferable for use in cooling blowers incorporated in vehicles. In particular, they are useful for the cooling blowers incorporated in hybrid vehicles and electric vehicles which operate with a large battery.

The invention claimed is:

1. A motor control system, comprising:
a motor control device for controlling a motor of a cooling blower for cooling a battery incorporated in a vehicle; and
a host controller including a plurality of different pieces of control software applicable to a plurality of destinations for the cooling blower, the host controller transmitting and receiving control information of the motor to and from the motor control device by means of PWM signals Si and So, wherein
the host controller embeds a destination-signal request pattern into the PWM signal Si for requesting a destination signal pattern to specify the destinations, and transmits the PWM signal Si to the motor control device;
the motor control device, upon receiving the destination-signal request pattern, embeds the destination signal pattern into the PWM signal So and transmits the PWM signal So to the host controller;
the host controller specifies one of the destinations for the cooling blower by extracting the destination signal pattern from the PWM signal So and changes over the control software to the control software applicable to the specified one of destinations for the cooling blower; and
the destination signal pattern is embedded into the PWM signal So by:
setting at least a first predetermined frequency and at least a first predetermined duty cycle of the PWM signal So as a first combination to represent a first data type, the first combination being unique to the first data type, and
setting at least a second predetermined frequency and at least a second predetermined duty cycle of the PWM signal So as a second combination to represent a second data type different than the first data type, the second combination being unique to the second data type,
wherein the first combination is different than the second combination.

2. The motor control system according to claim 1, wherein
the host controller modulates a PWM duty ratio of the PWM signal Si according to a target rotating-speed of the motor and then transmits the PWM signal Si to the motor control device;
the motor control device reconstructs the target rotating-speed from the received PWM signal Si and controls a rotating-speed of the motor; and
the motor control device modulates a PWM frequency of the PWM signal So by an actual rotating-speed information of the motor and then transmits the PWM signal So to the host controller.

3. The motor control system according to claim 2, wherein the destination-signal request pattern and the destination signal pattern are generated based on the PWM frequency, the PWM duty ratio, and a signal output time.

4. The motor control system according to claim 1, wherein
the first predetermined frequency is selected from a first range of frequencies unique to the first data type,
the first predetermined duty cycle is selected from a first range of duty cycles unique to the first data type,
the second predetermined frequency is selected from a second range of frequencies unique to the second data type,
the second predetermined duty cycle is selected from a second range of duty cycles unique to the second data type.

5. A method for controlling a motor of a cooling blower cooling a battery incorporated in a vehicle, the method comprising:
transmitting and receiving, by a host controller control information of the motor to and from a motor control device by means of PWM signals Si and So, the host controller being incorporated with a plurality of different pieces of control software applicable to a plurality of destinations for the cooling blower, the motor control device controlling the motor;
embedding by the host controller a destination-signal request pattern into the PWM signal Si for requesting a destination signal pattern to specify the destinations for the cooling blower, and transmitting the PWM signal Si to the motor control device;
determining by the motor control device whether the destination-signal request pattern is contained in the PWM signal, upon receiving the PWM signal Si;
upon receiving the destination signal request pattern, embedding the destination signal pattern into the PWM signal So and, where the destination-signal request pattern is contained or generating by the motor control device the PWM signal based on an actual rotating-speed information of the motor when the destination-signal request pattern is not contained, transmitting by the motor control device the generated PWM signal So to the host controller; and
detecting and extracting by the host controller the destination signal pattern from the received PWM signal So, specifying by the host controller one of the destinations for the cooling blower from the detected destination signal pattern, and switching over, by the host controller, to the control software applicable to the specified destination for the cooling blower,
wherein the destination signal pattern is embedded into the PWM signal So by:
setting at least a first predetermined frequency and at least a first predetermined duty cycle of the PWM signal So as a first combination to represent a first data type, the first combination being unique to the first data type, and
setting at least a second predetermined frequency and at least a second predetermined duty cycle of the PWM signal So as a second combination to represent a second data type different than the first data type, the second combination being unique to the second data type,
wherein the first combination is different than the second combination.

6. A motor control device for controlling a motor of a cooling blower based on a PWM signal Si, the cooling blower cooling a battery incorporated in a vehicle, the motor control device comprising:
a PWM-signal detecting unit for receiving a PWM signal Si from a host controller, and detecting a PWM frequency and a PWM duty ratio of the PWM signal Si;
a request-pattern determination unit for determining whether the PWM signal Si contains a destination-signal request pattern for requesting a destination signal pattern to specify destination for the cooling blower, based on an output of the PWM-signal detecting unit; and
a PWM-signal generation unit for generating a PWM signal So and embedding the destination signal pattern into the PWM signal So based on a determination result of the request-pattern determination unit, wherein the PWM-signal generation unit generates the PWM signal So based on the destination signal pattern when the destination-signal request pattern is contained or the PWM-signal generation unit generates the PWM signal So based on an actual rotating-speed information of the motor when the destination-signal request pattern is not contained, wherein the destination signal pattern is embedded into the PWM signal So by:
- setting at least a first predetermined frequency and at least a first predetermined duty cycle of the PWM signal So as a first combination to represent a first data type, the first combination being unique to the first data type, and
- setting at least a second predetermined frequency and at least a second predetermined duty cycle of the PWM signal So as a second combination to represent a second data type different than the first data type, the second combination being unique to the second data type, wherein the first combination is different than the second combination, and wherein the PWM-signal generation unit transmits the generated PWM signal So to the host controller.

7. The motor control device according to claim 6, wherein the PWM-signal detecting unit includes:
- a rising-edge detecting unit for detecting a rising-edge of the PWM signal Si;
- an edge-period detecting unit for detecting the PWM frequency based on an output of the rising-edge detecting unit; and
- a duty-ratio detecting unit for detecting the PWM duty ratio based on the output of the rising-edge detecting unit.

8. The motor control device according to claim 6, wherein the PWM-signal generation unit includes:
- a frequency computing unit for computing the PWM frequency;
- a duty-ratio computing unit for computing the PWM duty ratio; and
- a PWM-signal output unit for generating the PWM signal So based on the PWM frequency and the PWM duty ratio.

* * * * *